Patented July 1, 1930

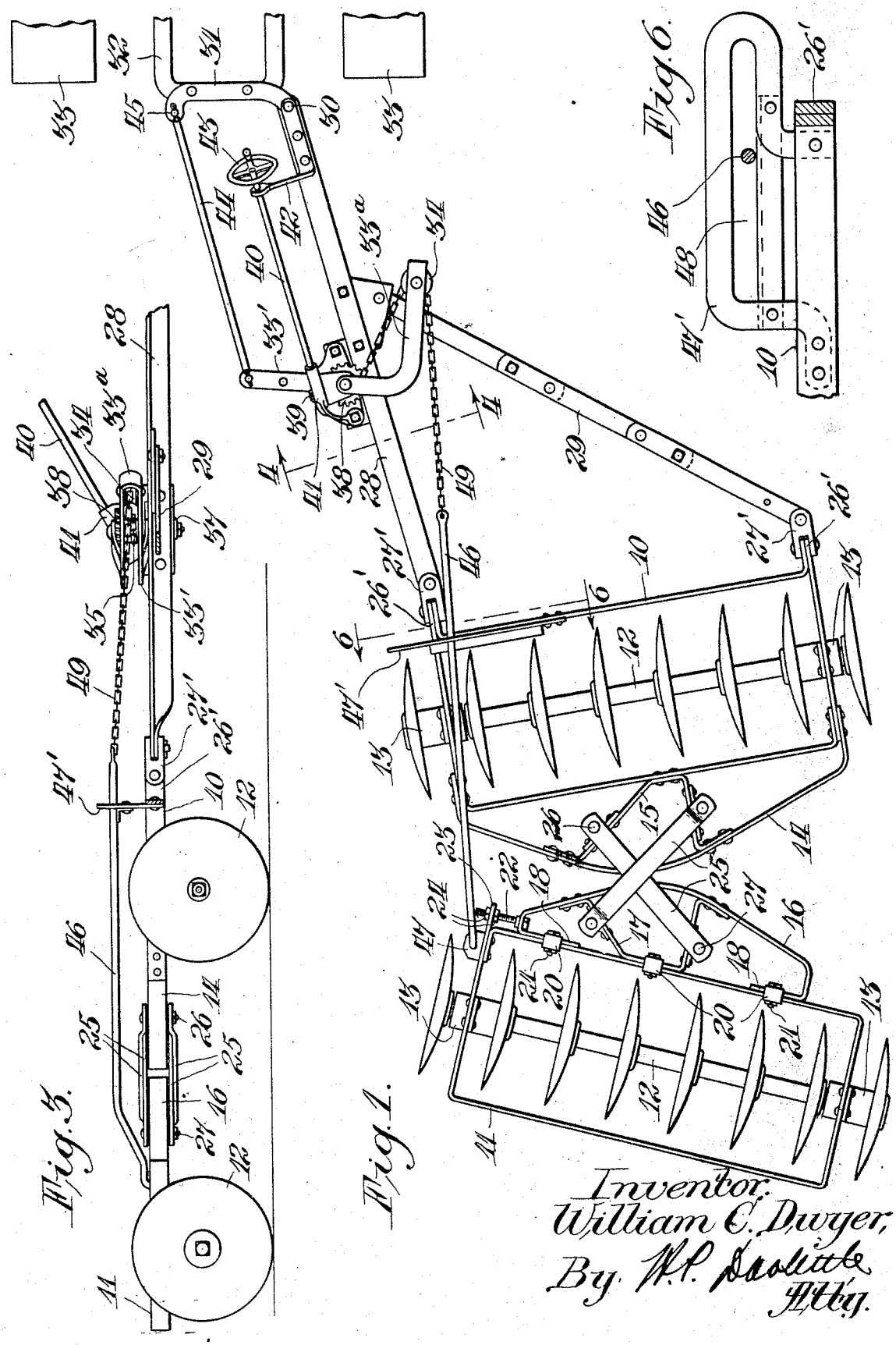

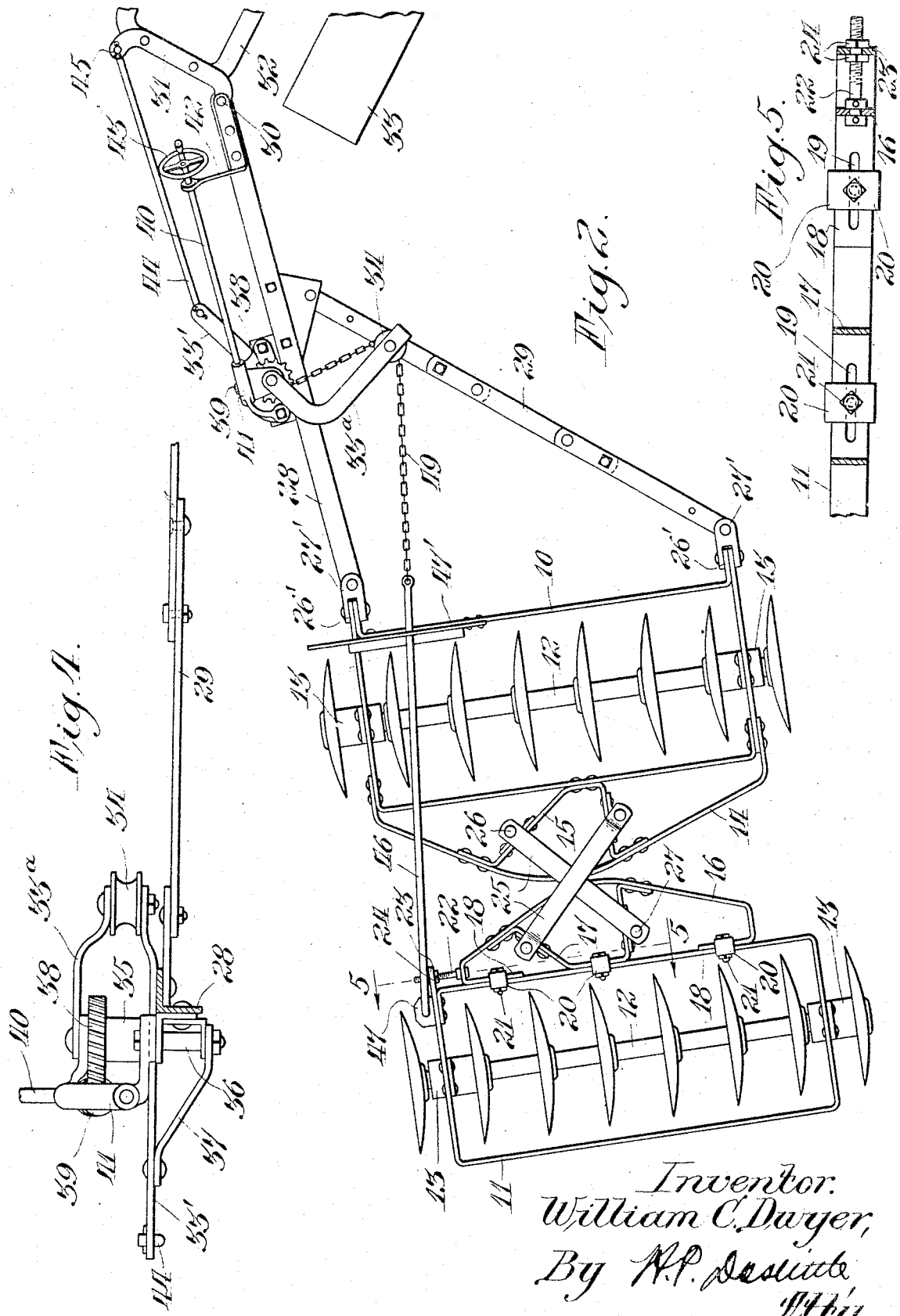

1,769,123

UNITED STATES PATENT OFFICE

WILLIAM C. DWYER, OF AUBURN, NEW YORK, ASSIGNOR TO INTERNATIONAL HARVESTER COMPANY, A CORPORATION OF NEW JERSEY

TRACTOR DISK HARROW

Application filed November 7, 1927. Serial No. 231,433.

This invention relates to tractor disk harrows and particularly to those of the two gang tandem type. The main objects of the invention are to provide a harrow of the two gang type which will be readily adjustable manually to set the desired horizontal working angle between the two disk gangs and which will automatically return the gangs to parallel relation when a short turn of the tractor and harrow is made in one direction, for example, to the right, and automatically restore the gangs to the original working angle upon resumption of straight forward travel, and also permit short turns in the opposite direction without disturbance of the working angle.

Other objects are to provide a form of connection between the two gangs that will be flexible in a horizontal direction and rigid with respect to vertical movement; which will maintain the disks of the respective gangs in proper staggered relation; and which will allow adjustment of one gang laterally with respect to the other.

The foregoing, as well as other objects and advantages, which will become obvious upon disclosure of the invention, are attained by the structure hereinafter more specifically described and in which the invention as defined in the appended claims is embodied.

Referring to the drawings,—

Figure 1 is a plan view of a tractor disk harrow embodying the invention with the disk gangs thereof shown as set at working angles;

Figure 2 is a similar plan view showing the parts in the positions assumed on a right turn;

Figure 3 is a side view of the harrow show in Figures 1 and 2;

Figure 4 is a detail view on an enlarged scale of part of the adjusting mechanism, as viewed on the line 4—4 of Figure 1;

Figure 5 is a detail view, on an enlarged scale, of an adjustable connection embodied in the structure, as viewed on the line 5—5 of Figure 2; and Figure 6 is a detail view of a portion of the front frame as viewed on the line 6—6 of Figure 1.

In the preferred embodiment of the invention forming the structure herein disclosed there is illustrated a tractor disk harrow comprising a pair of implement frames 10 and 11, which are preferably of generally oblong and rectangular form and which are arranged in tandem relation with the longer diameters of the frames extending transversely to the direction of travel. Each frame carries a gang or series 12 of tillage disks. The disks are of the conventional concavo-convex form and the disks in the gangs on the respective frames are directed in opposite directions. Usually the front gang throws out and the rear gang throws in. The disks may be mounted on a single shaft, as is the usual practice, and the shaft is journaled in bearing boxes 13 secured to the end members of frames 10 and 11. The adjacent or facing sides of the two frames are connected in such a manner as to allow rocking or angular adjustment of the respective frames in a horizontal plane while rigidly connecting them as against any vertical tilting movement on each other in a fore and aft direction. This connection preferably comprises auxiliary frames on the adjacent sides of the gang frames. On the forward frame an arcuate bar 14 is secured to the ends of the frame 10 and extends rearwardly in the same plane as the frame. The bar 14 is trussed or braced at its center by the member 15 secured to the central portion of the forward frame and having diverging arms secured to the arcuate portion of the bar 14. The rear frame 11 has a corresponding arcuate bar 16 which is braced on the frame 11 by a member 17 similar in structure to the member 15. The rear auxiliary frame, made up of bar 16 and member 17, is preferably connected to the gang frame 11 in such a manner as to allow a certain range of lateral adjustment on that frame. As best shown in Figures 1 and 5, the adjustment is made possible by bending in the ends 18 of bar 16 so that they lie in parallel relation to the front bar of frame 11 and are in alignment with the bight or arch portion of member 17, which is flattened. The ends 18 and the flattened portion of bar 17 are in alignment and are preferably slotted, as at 19, and are received in slide collars 20 secured to the frame 11 by bolts 21, which pass through the collars 20 and the frame 11 and engage the slots 19. It will be obvious that, when the bolts 21 are drawn up, the frame 11 and auxiliary connecting frame will be fixedly secured together and that, when these bolts are loosened, the auxiliary frame will be laterally adjustable with respect to frame 11 within the extent of the slots 19. This adjustment is preferably effected by means of a screw-threaded bolt 22 secured to one end of the bar 16 and passing through a projecting part 23 on the frame 11, to which it may be secured at desired adjustment by means of nuts 24. The adjustable structure just described permits accurate setting of the gangs to bring the disks in proper staggered relation when at working angle. The arcuate bars 14 and 16 of the auxiliary frames are approximately in rocking contact, as shown in Figures 1 and 2, and the auxiliary frames are connected by freely movable crossed members or bars 25 which are pivoted to the respective frames on vertical axes at 26, 27, thus locating the pivot points of the members 25 in such manner as to bring the proximate parts of the arcuate bars 14 and 16 opposite the middle portions of the crossed bars 25. As shown in Figure 3, the crossed bars 25 are preferably double; that is, two of the bars are located below the auxiliary connecting frames and two of the bars are located above, thus enclosing the auxiliary frames and the arcuate bars between pairs of the crossed links. This construction, while permitting free angular movement between the implement frames in a horizontal plane effectively braces and holds the frames against any fore and aft tilting movement in a vertical plane.

Disk implement frames constructed and connected as above described are capable of general use, but are particularly adapted for use in connection with the novel control mechanism and draft connections now to be described. In the present instance, the front frame 10 is shown as formed at each end with a forwardly projecting lug 26'. On each of these lugs there is pivotally mounted a clevis 27', which clevises form the point of attachment for draft rigging comprising converging draft bars 28 and 29. The draft bar 28 extends beyond the point of connection of the two draft bars and is pivotally connected at 30 on a vertical axis to a transversely extending bar 31, which is secured in any suitable manner to the transverse portion of the usual arched tractor drawbar 32 mounted on a tractor, the rear wheels of which are shown in part at 33. The draft bar 29 has been illustrated as formed of sections which may be connected in different relations to lengthen or shorten this bar, thereby changing the angular relation of the two draft bars and, therefore, the offset relation of the hitch point 30 with respect to the harrow. The construction of these hitch bars, however, forms no part of the present invention and will not be further described, as said construction forms the subject-matter of assignee's copending application by A. C. Lindgren, Serial No. 231,405, filed November 7, 1927. The preferred mechanism for controlling the working angles of the implement frames consists of a bell crank lever 33' pivoted intermediate its ends to the draft bar 28 on a vertical axis and having one of its arms 33ª extended in the direction of the length of the draft bar 28 and its other arm extending transversely thereto. As seen in Figure 4, the arm 33ª is forked or double and has a pulley 34 journaled between its outer ends. The two parts of this arm diverge from the pulley 34 to the pivot point of the lever, where they enclose a winding drum 35 journaled on the axis of the lever 33'. In order to afford a brace for the transverse arm of lever 33, the bolt of the pivot of the lever and axle for the drum 35 is extended downwardly under bar 28, as at 36, and a truss member or brace 37 connects the end of the pivot bolt with the arm of the lever. As manually operable means for turning the drum 35, said drum is provided with a worm wheel 38, which is in mesh with a worm 39 fixed on an actuating shaft 40, which is journaled in a suitable bracket 41 mounted on bar 28 in a bracket 42 near the forward end of this bar. The end of the actuating rod 40 adjacent the hitch point of the harrow is provided with a suitable hand wheel 43 within reach of the operator on the tractor. The end of the cross arm of lever 33' is pivotally connected through a link 44 with the bar 31 on the drawbar 32. The link 44 is pivoted to the drawbar at a point 45, which is spaced laterally from the hitch point 30 of the harrow. The rear implement frame 11 is connected to lever 33' by means of a link 46, which is pivoted to a lug 47 secured on the inner end of frame 11. Link 46 extends forwardly over frame 10 and passes through a slotted supporting bracket 47' on that frame. As shown in Figure 6, the bracket 47' has an elongated slot 48 of sufficient length to permit of any necessary lateral movement of the link therein. On the forward end of the link 46, beneath the bracket 47', there is attached a chain or flexible element 49, which extends forwardly and passes over pulley 34 in the end 33ª of lever 33' and thence to the drum 35 where its end is secured.

With the adjusting mechanism just described, it will be seen that rotation of the hand wheel 43 will either wind or unwind the chain 49 and thereby alter the effective length of the connection between the rear frame 11 and the lever 33'. When the chain is fully unwound, the disk gangs will assume a parallel position as the implement is drawn through the soil, and, as the chain is wound on the drum and the effective length of the connection is shortened, the rear frame will be rocked on its connection to frame 10 and the draft thrust developed will cause the frames to assume the working angle shown in Figure 1. The angle so set will be retained so long as the tractor and harrow travel in a straight forward direction, or make only a left turn. The left turn can be made without materially affecting the working angle of the gangs, by reason of the fact that the arc of movement of the end of the arm 33ª of lever 33', during such a turn, will be substantially around the pivot point of link 46 as a center, and, therefore, have little effect on the adjusting connection. When a right turn is to be made, however, the arc of movement of the arm 33ª will be towards the right and backwardly, as shown in Figure 2, and the effective length of the connection between the two frames, comprising link 46 and chain 49, will be increased to an extent permitting the two disk gangs to assume a substantially parallel relation, thereby facilitating the turn to the right. Upon resumption of forward travel, the swing of lever 33' as a result of the angular movement of the draft bar in a horizontal plane will bring the angling connection back to the position of Figure 1, thus causing the gangs to take the working angle originally set.

Accordingly, the invention herein disclosed simplifies a tractor disk harrow of the orchard type in which a pair of implement frames equipped with a series of disks are rigidly connected, as regards tilting movement, but are free to rock on each other on a horizontal plane, and in which manually operable means is provided for adjusting the working angle of the gangs, which means includes automatic mechanism for causing the gangs to assume a parallel relation when a turn to the right is made.

It is obvious that the preferred structure disclosed may be modified in many respects without departure from the scope of the invention as defined in the following claims.

What is claimed is:

1. The combination with a tractor drawbar, of a frame pivotally hitched to the tractor drawbar on a vertical axis, an implement frame coupled to said frame for horizontal angular adjustment, a connection between said frames including means for manually adjusting the angle of the implement frame, and means connected to the tractor drawbar and actuated by angular movement thereof in a horizontal plane for shifting said connection in the direction of its length, thereby automatically altering the adjustment of the implement upon turning movement of the tractor.

2. The combination with a tractor drawbar, of a frame pivotally hitched to the tractor drawbar on a vertical axis, an implement frame coupled to said frame for horizontal angular adjustment, an adjusting connection extending from said implement frame forwardly to a point of attachment on the first mentioned frame, manually operable means on said frame for adjusting the implement frame by altering the effective length of said connection, and means for shifting the connection in the direction of its length upon angular movement of the tractor drawbar in a horizontal plane, thereby automatically altering the adjustment of the implement upon turning movement of the tractor.

3. The combination with a tractor drawbar, of a forwardly positioned frame pivotally hitched to the tractor drawbar on a vertical axis, a rearwardly positioned implement frame coupled to said forward frame for horizontal angular adjustment, a series of tillage disks carried by the implement frame, an adjusting connection attached to one end of said implement frame and extending forwardly to a point of attachment on the forward frame, manually operable means on the forward frame for adjusting the implement frame by altering the effective length of said connection, and means for shifting the connection in the direction of its length upon angular movement of the tractor drawbar in a horizontal plane, thereby automatically altering the adjustment of the implement frame upon turning movement of the tractor.

4. The combination with a tractor drawbar, of a frame pivotally hitched to the tractor drawbar on a vertical axis, an implement frame coupled to said frame for horizontal angular adjustment, an adjusting connection extending from said implement frame forwardly to a point of attachment on the first mentioned frame including a flexible element, a lever fulcrumed on said frame and provided with a part over which said flexible element passes, a winding drum on the frame to which the end of the flexible element is secured, and means for swinging the lever upon angular movement of the drawbar in a horizontal plane.

5. The combination with a tractor drawbar, of a frame pivotally hitched to the tractor drawbar on a vertical axis, an implement frame coupled to said frame for horizontal angular adjustment, an adjusting connection extending from said implement frame forwardly to a point of attachment on the first mentioned frame including a flexible element, a lever fulcrumed intermediate its ends on said frame and provided with a pulley on one end over which said flexible element passes, a manually operable winding drum located at the fulcrum point of said lever and receiving said flexible element, and a link connecting the other end of said lever to the drawbar at a point spaced from the hitch point of the frame.

6. In a tractor disk harrow, the combination of a pair of pivotally connected tandem frames, a series of tillage disks carried by each frame, a transversely extending tractor drawbar, a draft bar connected to the forward frame and pivoted on a vertical axis to one point on the drawbar, a lever pivoted between its ends on the draft bar, a rigid link pivoted to one end of said lever and to a second laterally spaced point on the drawbar, and a connection between the other end of said lever and one of the frames.

7. In a tractor disk harrow, the combination of a pair of pivotally connected tandem frames, a series of tillage disks carried by each frame, a transversely extending tractor drawbar, a draft bar connected to the forward frame and pivoted on a vertical axis to one point on the drawbar, a bell crank lever pivoted between its ends on the draft bar on a vertical axis with one arm extended in the direction of the length of the draft bar and the other transversely thereof, a link pivoted to the transverse arm of said lever and to a second laterally spaced point on the drawbar, and a connection between the other arm of said lever and one of said frames.

8. In a tractor disk harrow, the combination of a pair of pivotally connected tandem frames, a series of tillage disks carried by each frame, a draft member on the front frame, and means for adjusting the angular relation of the frames comprising a link connected to one end of one of said frames and extending forwardly, a flexible element connected to the forward end of said link, a winding drum on the draft member on which said flexible element is wound, and means for actuating said drum including a manually rotatable shaft extending towards the forward end of the draft member.

9. In a tractor disk harrow, the combination of a pair of frames, a series of tillage disks carried by each frame, connecting means between the frames comprising freely movable crossed members pivoted on vertical axes to the respective frames, means for adjusting one of said frames laterally with respect to said members, and means for adjusting the horizontal angular relation of the frames.

10. In a tractor disk harrow, the combination of a pair of oblong implement frames disposed in tandem relation with the longer diameter thereof transverse to the direction of travel, a series of tillage disks mounted in each frame, connecting means between the adjacent sides of said frames comprising freely movable crossed members, means for resisting fore and aft tilting movement of said frames relatively to each other comprising auxiliary frames fixed to the adjacent sides of the implement frames and having portions slidably engaging said crossed members intermediate the ends thereof, and means for adjusting the horizontal angular relation of the implement frames.

11. In a tractor disk harrow, the combination of a pair of oblong implement frames disposed in tandem relation with the longer diameter thereof transverse to the direction of travel, a series of tillage disks mounted in each frame, connecting means between the adjacent sides of said frames comprising auxiliary frames respectively secured to said sides and extending towards each other in the plane of the implement frames, said frames having arcuate outer members in proximate contact, freely movable crossed members pivoted on vertical axes to the respective auxiliary frames at points inward of said arcuate portions and having sliding engagement with said portions, and means for adjusting the horizontal angular relation of said implement frames.

In testimony whereof I affix my signature.

WILLIAM C. DWYER.